United States Patent
Megiddo et al.

(10) Patent No.: US 10,915,219 B2
(45) Date of Patent: *Feb. 9, 2021

(54) TRACKING CHANGES IN COLLABORATIVE AUTHORING ENVIRONMENT

(71) Applicant: MICROSOFT TECHNOLOGY LICENSING, LLC, Redmond, WA (US)

(72) Inventors: Eran Megiddo, Redmond, WA (US); David Rasmussen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,530

(22) Filed: May 20, 2019

(65) Prior Publication Data

US 2019/0339819 A1 Nov. 7, 2019

Related U.S. Application Data

(63) Continuation of application No. 14/981,974, filed on Dec. 29, 2015, now Pat. No. 10,331,290, which is a
(Continued)

(51) Int. Cl.
*G06F 3/048* (2013.01)
*G06F 3/0481* (2013.01)
(Continued)

(52) U.S. Cl.
CPC ............ *G06F 3/0481* (2013.01); *G06F 3/048* (2013.01); *G06F 40/169* (2020.01);
(Continued)

(58) Field of Classification Search
CPC .... G06F 3/0481; G06F 40/169; G06F 40/197; G06F 3/048; H04L 12/1831; H04L 51/16; H04L 51/36; H04L 67/22; G06Q 10/101
See application file for complete search history.

(56) References Cited

U.S. PATENT DOCUMENTS

| 6,021,403 A | 2/2000 | Horvitz et al. |
| 6,553,358 B1 | 4/2003 | Horvitz |
(Continued)

OTHER PUBLICATIONS

"Final Office Action Issued in U.S. Appl. No. 14/578,466", dated Dec. 16, 2019, 16 Pages.
(Continued)

*Primary Examiner* — Pei Yong Weng
(74) *Attorney, Agent, or Firm* — Newport IP, LLC; Scott Y. Shigeta

(57) ABSTRACT

Change tracking and collaborative communication are provided in authoring content in a collaborative environment. Monitored changes, comments, and similar input by the collaborating authors may be presented on demand or automatically to each author based on changes and/or comments that affect a particular author, that author's portion of collaborated content, type of changes/comments, or similar criteria. Change and/or comments notification may be provided in a complementary user interface of the collaborative authoring application or through a separate communication application such as email or text messaging.

20 Claims, 10 Drawing Sheets

Related U.S. Application Data continuation of application No. 13/848,027, filed on Mar. 20, 2013, now Pat. No. 9,256,341.

(51) Int. Cl.
| | | |
|---|---|---|
| *G06Q 10/10* | (2012.01) | |
| *H04L 12/18* | (2006.01) | |
| *G06F 40/169* | (2020.01) | |
| *G06F 40/197* | (2020.01) | |
| *H04L 12/58* | (2006.01) | |
| *H04L 29/08* | (2006.01) | |

(52) U.S. Cl.
CPC ......... *G06F 40/197* (2020.01); *G06Q 10/101* (2013.01); *H04L 12/1831* (2013.01); *H04L 51/16* (2013.01); *H04L 51/36* (2013.01); *H04L 67/22* (2013.01)

(56) References Cited

U.S. PATENT DOCUMENTS

| | | | |
|---|---|---|---|
| 7,623,710 B2 | 11/2009 | Simard et al. | |
| 8,032,470 B1 | 10/2011 | Heidenreich et al. | |
| 2006/0041589 A1* | 2/2006 | Helfman | ............... G06F 16/958 |
| 2010/0325016 A1 | 12/2010 | Marcus et al. | |
| 2013/0275892 A1 | 10/2013 | Li et al. | |
| 2014/0195899 A1* | 7/2014 | Bastide | ................ G06F 40/166 |
| | | | 715/256 |
| 2014/0281875 A1* | 9/2014 | Branton | ................ G06F 40/169 |
| | | | 715/230 |
| 2015/0074516 A1 | 3/2015 | Ben-aharon et al. | |

OTHER PUBLICATIONS

"Final Office Action Issued in U.S. Appl. No. 14/578,464", dated Dec. 26, 2019, 18 Pages.

"Non Final Office Action Issued in U.S. Appl. No. 14/578,466", dated Jun. 12, 2019, 21 Pages.

"Non Final Office Action Issued in U.S. Appl. No. 14/578,461", dated Jul. 18, 2019, 19 Pages.

"Non Final Office Action Issued in U.S. Appl. No. 14/578,464", dated Jul. 18, 2019, 17 Pages.

"Notice of Allowance Issued in U.S. Appl. No. 14/578,464", dated Jun. 24, 2020, 11 Pages.

"Office Action Issued in Indian Patent Application No. 6413/CHENP/2015", dated Apr. 24, 2020, 6 Pages.

"Final Office Action Issued in U.S. Appl. No. 14/578,461", dated Mar. 17, 2020, 17 Pages.

* cited by examiner

TRACKING CHANGES IN COLLABORATIVE AUTHORING ENVIRONMENT

CROSS-REFERENCE TO RELATED APPLICATION

This Application is a continuation under 35 U.S.C. § 120 of U.S. patent application Ser. No. 14/981,974 filed on Dec. 29, 2015, entitled "Tracking Changes in Collaborative Authoring Environment," which is a continuation of U.S. patent application Ser. No. 13/848,027 filed on Mar. 20, 2013, now U.S. Pat. No. 9,256,341, entitled "Tracking Changes in Collaborative Authoring Environment." The disclosure of both U.S. Patent Applications are hereby incorporated by reference in their entirety.

BACKGROUND

Content processing applications and services, especially textual content, provide a number of controls for selecting, modifying aspects of content such as formatting, grammatical or stylistic corrections, even word replacements through synonym/antonym suggestions. In typical systems, such controls are available individually, sometimes independently or interdependently. Thus, users may be enabled to select and modify aspects of content they create or process, but they have to do it manually.

Furthermore, creating content to match a particular style (not necessarily formatting, but prose style) is mostly a manual process left to the user in conventional applications. For example, if an organization has a particular preference for not only formatting, but also choice of words, sentence structure, and similar aspects of documents created by its members, it may be a process left to individual users to learn and apply the organization's preferences.

Content creation or modification in collaborative environments, where content may be created and processed by multiple users simultaneously and/or sequentially, may be specially challenging for authors trying to keep track of their own changes as well as others.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling change tracking and collaborative communication in authoring content in a collaborative environment. Monitored changes, comments, and similar input by the collaborating authors may be presented on demand or automatically to each author based on changes/comments that affect a particular author, that author's portion of collaborated content, type of changes/comments, or similar criteria. Notification about changes/comments may be provided in a complementary user interface of the collaborative authoring application or through a separate communication application such as email or text messaging. Versions of collaborative content may be preserved along with changes, notes, comments, and so on, and be restorable. A pivot history by author as well as a comparison of versions and associated metadata may be presented on request.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
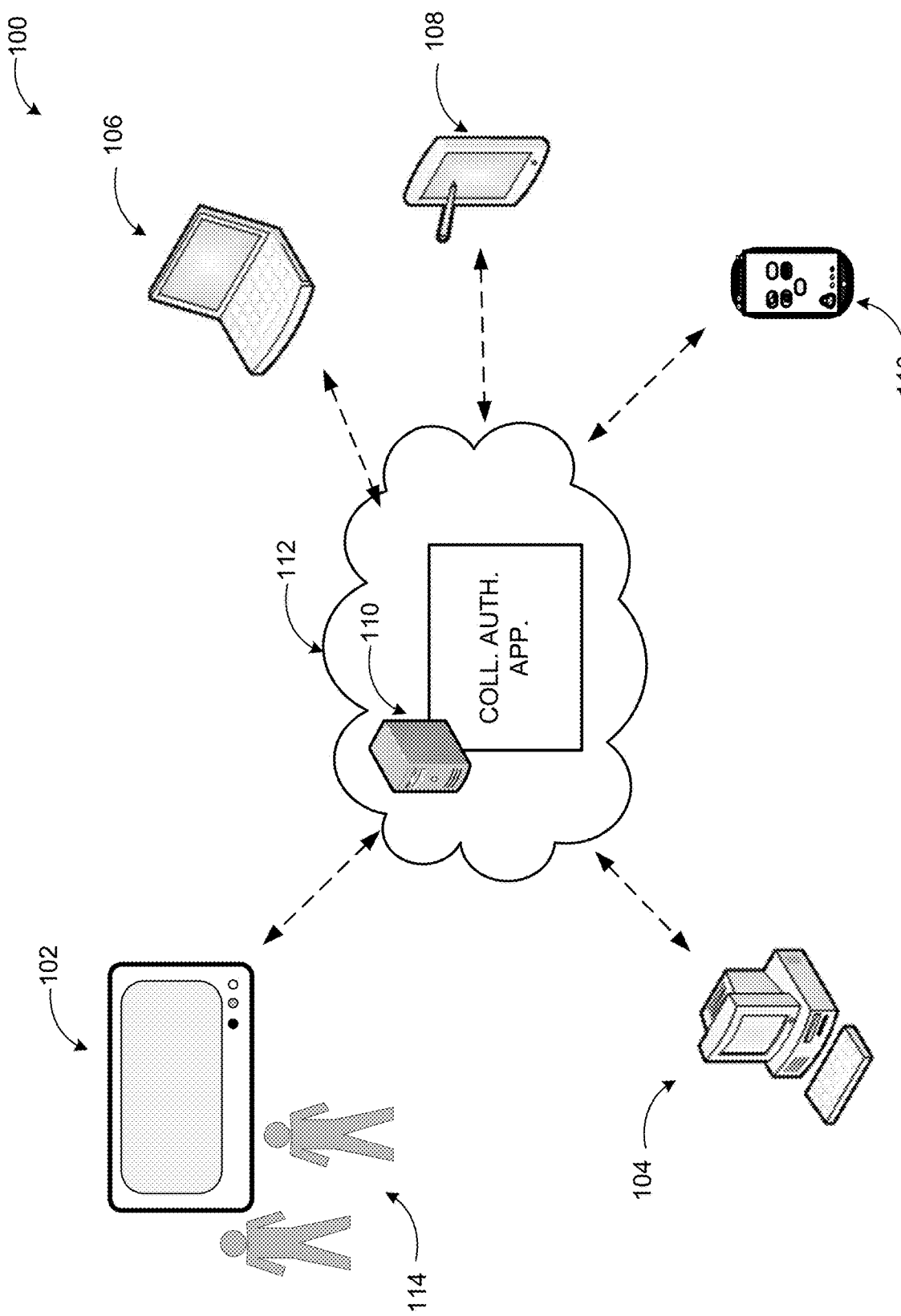
FIG. 1 includes a conceptual diagram illustrating a local and networked configuration environment, where change tracking in a collaborative authoring environment may be implemented.

As briefly described above, changes may be tracked in a collaborative authoring environment, notifications may be provided of changes that affect a particular user, co-authors may be notified about changes, versions and/or notes may be restored and/or compared, and a pivot history provided by author.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for automated content collaboration functionality. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, conceptual diagram 100 illustrates a local and networked configuration environment, where change tracking in a collaborative authoring environment may be implemented. The computing devices and computing environments shown in diagram 100 are for illustration purposes. Embodiments may be implemented in various local, networked, and similar computing environments employing a variety of computing devices and systems.

Diagram 100 represents a networked computing environment, where a collaborative authoring application (or service) 110 executed on a server may be accessed by a plurality of authors such as authors 114 to create and process content individually or collaboratively. The collaborative authoring application 110 may be accessed via network 112 by browsers or locally installed client applications on a desktop computer 104, a laptop computer 106, a tablet 108, a smart phone 116, a smart whiteboard 102, and similar devices. The collaborative authoring application may also be part of a hosted service executed on one or more servers.

The collaborative authoring application 110 may enable authors to create and modify content including, but not limited to, text, images, graphics, embedded objects (e.g., audio, video objects, etc.). Authors may create distinct portions of the content to be combined into a single, coherent work, may modify each other's (or their own) work, comment on each other's work, provide notes, and reply to comments/changes. Notifications of changes, comments, notes, and replies on the collaborative content may be provided through various communication means, such as email, text messages, publication to social/professional networks, blogs, and similar means. The collaborative authoring application 110 may be a word processing application, a presentation application, a spreadsheet application, a note taking application, and comparable ones.

The example systems in FIG. 1 have been described with specific servers, client devices, applications, and interactions. Embodiments are not limited to systems according to these example configurations. A platform providing change tracking in a collaborative authoring environment may be implemented in configurations employing fewer or additional components and performing other tasks. Furthermore, specific protocols and/or interfaces may be implemented in a similar manner using the principles described herein.

Figure 2:
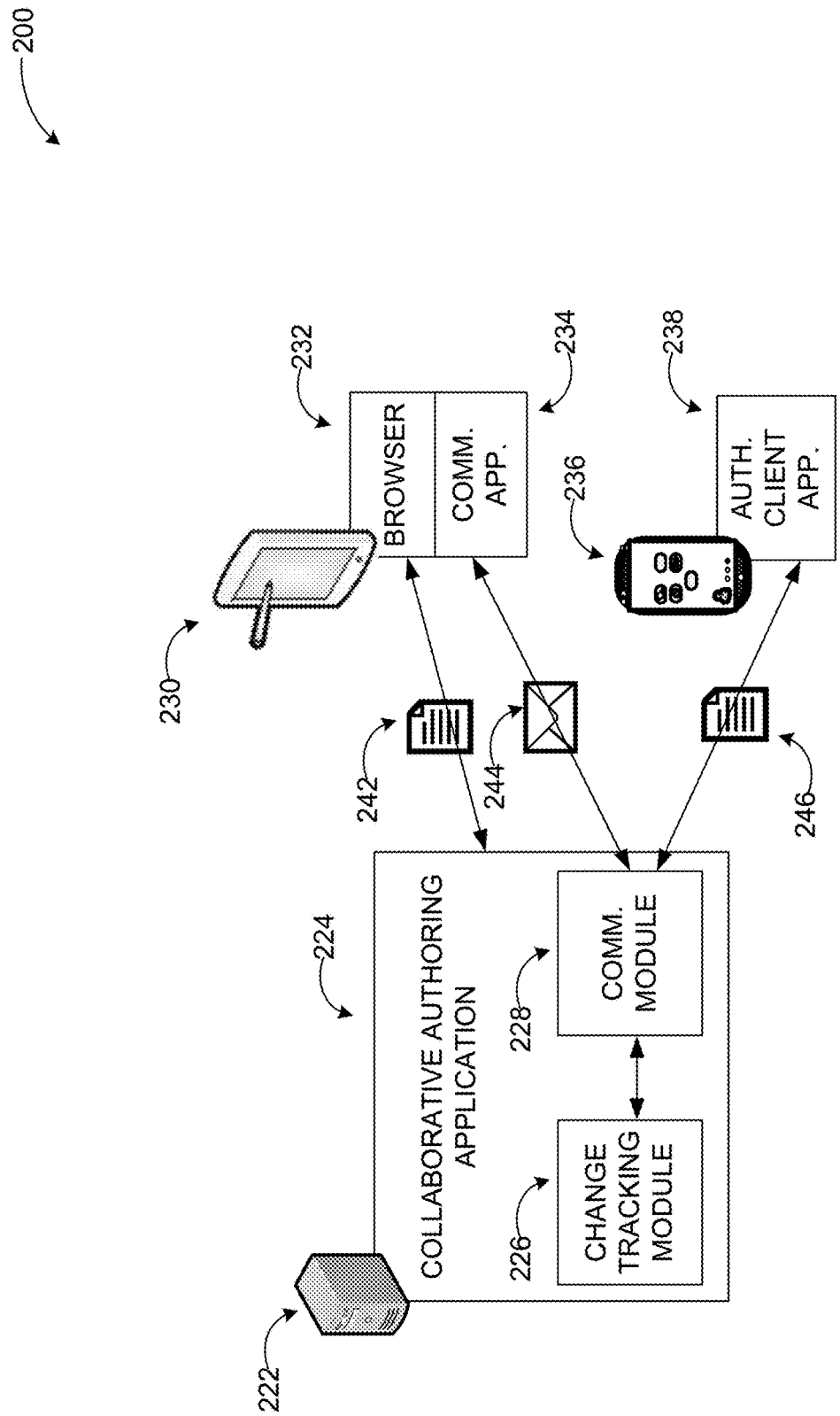
FIG. 2 illustrates an example collaborative authoring environment for tracking changes according to some embodiments.

Referring to FIG. 2, diagram 200 illustrates an example collaborative authoring environment for tracking changes according to some embodiments.

In the example configuration of diagram 200, collaborative application 224 is executed on a server 222 and accessed through thin or thick client applications such as browser 232 on tablet 230 or authoring client application 238 on smart phone 236. The collaborative authoring application 224 may include a change tracking module 226 and a communication module 228. Collaborative content may be provided and authors enabled to create/edit content and comment on it through their respective client applications. This is conceptually illustrated in the diagram by exchange of content 242 and 246.

Notifications of changes, comments, notes, and replies on the collaborative content may be provided through the communication module 228 to communication applications such as communication application 234 on tablet 230 as shown by email exchange 244. In other embodiments, the notifications may be provided and exchanged through a complementary user interface of the collaborative authoring application 224 displayed on the respective client applications.

Figure 3:
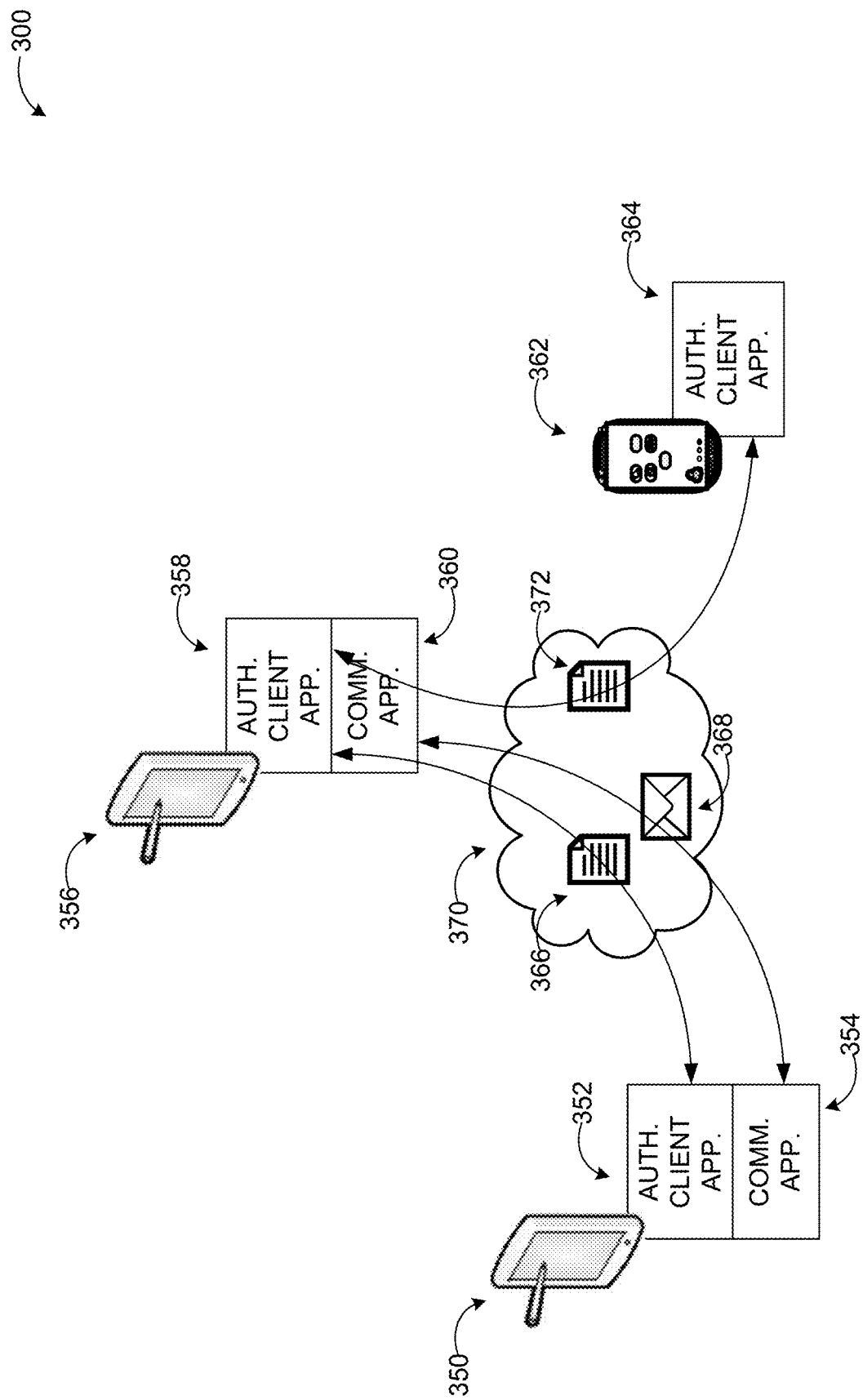
FIG. 3 illustrates another example collaborative authoring environment for tracking changes according to other embodiments.

FIG. 3 illustrates another example collaborative authoring environment for tracking changes according to other embodiments.

In the example configuration of diagram 300, collaboration may be achieved through distributed authoring client applications executed on various client devices such as authoring client applications 352, 358, and 364 executed on tablet 350, tablet 356, and smart phone 364, respectively. The authoring client applications may communicate over one or more networks 370 exchanging content 366 and 372.

As in the example configuration of FIG. 2, notifications may be exchanged through a user interface of the authoring applications or individual communication applications 354 and 360 executed on client devices (e.g., email exchange 368). Other configurations such as a combination of a hosted service and locally installed/executed collaborative authoring applications may be implemented as well using the principles described herein.

Figure 4:
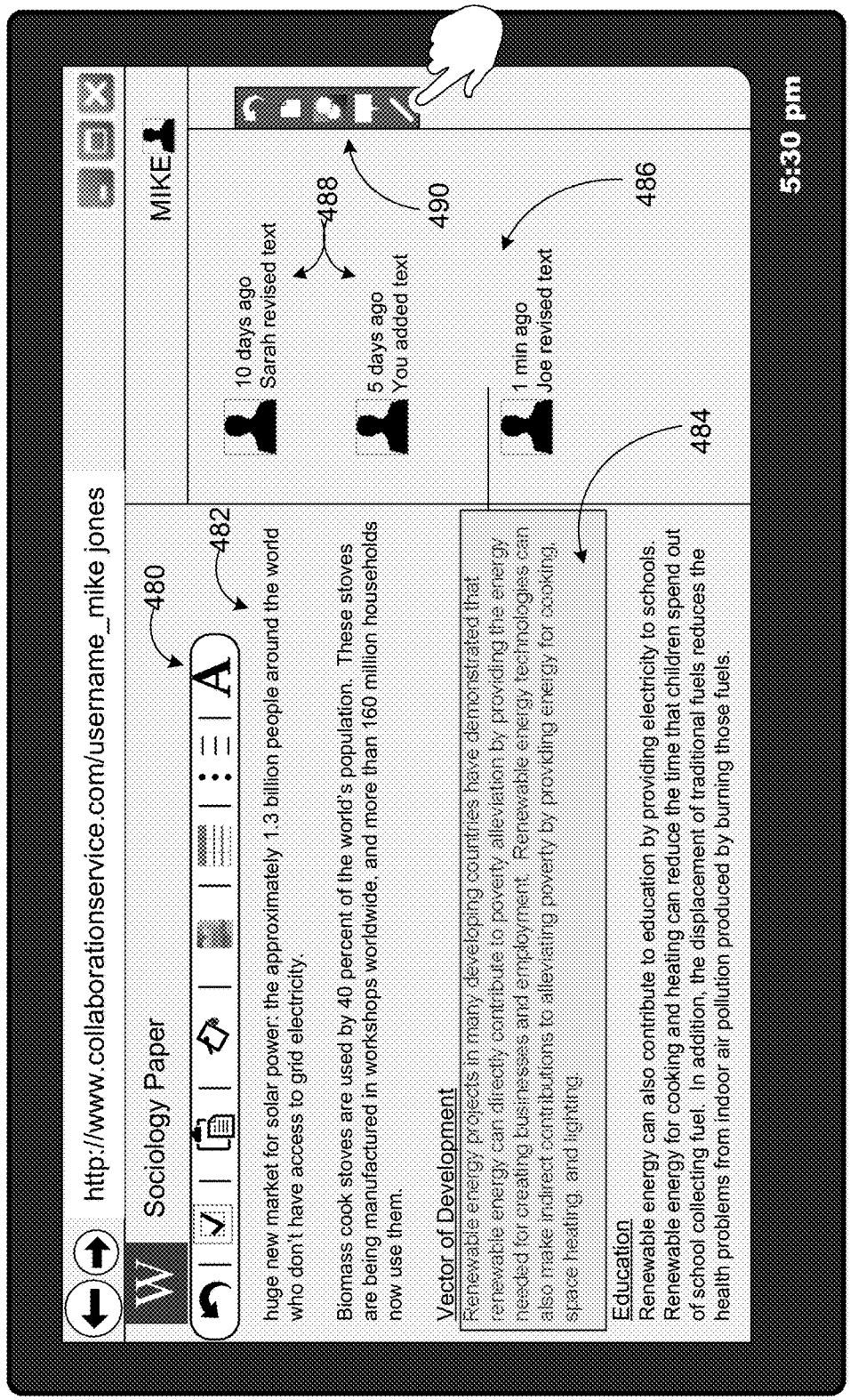
FIG. 4 illustrates a screenshot of an example user interface allowing for collaborative content by individual authors to be tracked.

FIG. 4 illustrates a screenshot 400 of an example user interface allowing for collaborative content by individual authors to be tracked.

In the example screenshot 400, a sociology paper is being collaboratively created by a team. The user interface presents the created content 402 with editing controls 480. In a complementary user interface adjacent to the presented content, a list of changes, who made the change, and when are listed (change notices 488 and 486). While older changes are indicated in summary form only (e.g., "created text", "revised text"), the latest change is also tied to a highlighted portion 484 of the content associated with the change. For example, one of the collaborating authors ("Joe") may have revised the highlighted portion of the textual content. Thus, in a collaborative authoring application according to embodiments, an author may be enabled to select a portion of content 484 within presented content and see who among the collaborators (486) has processed the selected portion of content 484 through a collaboration pane. While the revised content is shown in its updated form, the changes may be shown upon user action such as touching the highlighted portion or activating a control according to some embodiments.

A collaborative authoring application user interface may also present additional controls 490, which may be activated by touch or gesture input 492, for switching between different modes or user interfaces, providing a comment, editing the content, publishing the content or an author's edits, etc. The information associated with the collaborators and modified content may be hidden/presented based on current user's choice (e.g., toggling of a control on the user interface).

The browser user interface shown in the screenshot 400 is for illustration purposes. In addition to standard elements such as an address of the current web page, a search box, command menus, and a tab indicating the web page, other elements may be provided in various locations and in any order using the principles described herein. A collaborative authoring application user interface may also include custom elements like in a locally installed and executed application.

Furthermore, individually edited content may be presented as a collaboratively created product to a group leader or collaborator. Natural language may be employed in interaction and processing. In addition to touch and gesture based input, other input mechanisms such as conventional keyboard/mouse input, voice commands, eye-tracking, and similar ones may also be accepted. Moreover, embodiments may be implemented as web apps in any end-point enabling real-time co-authoring and support the collaborative process end-to-end.

Figure 5A:
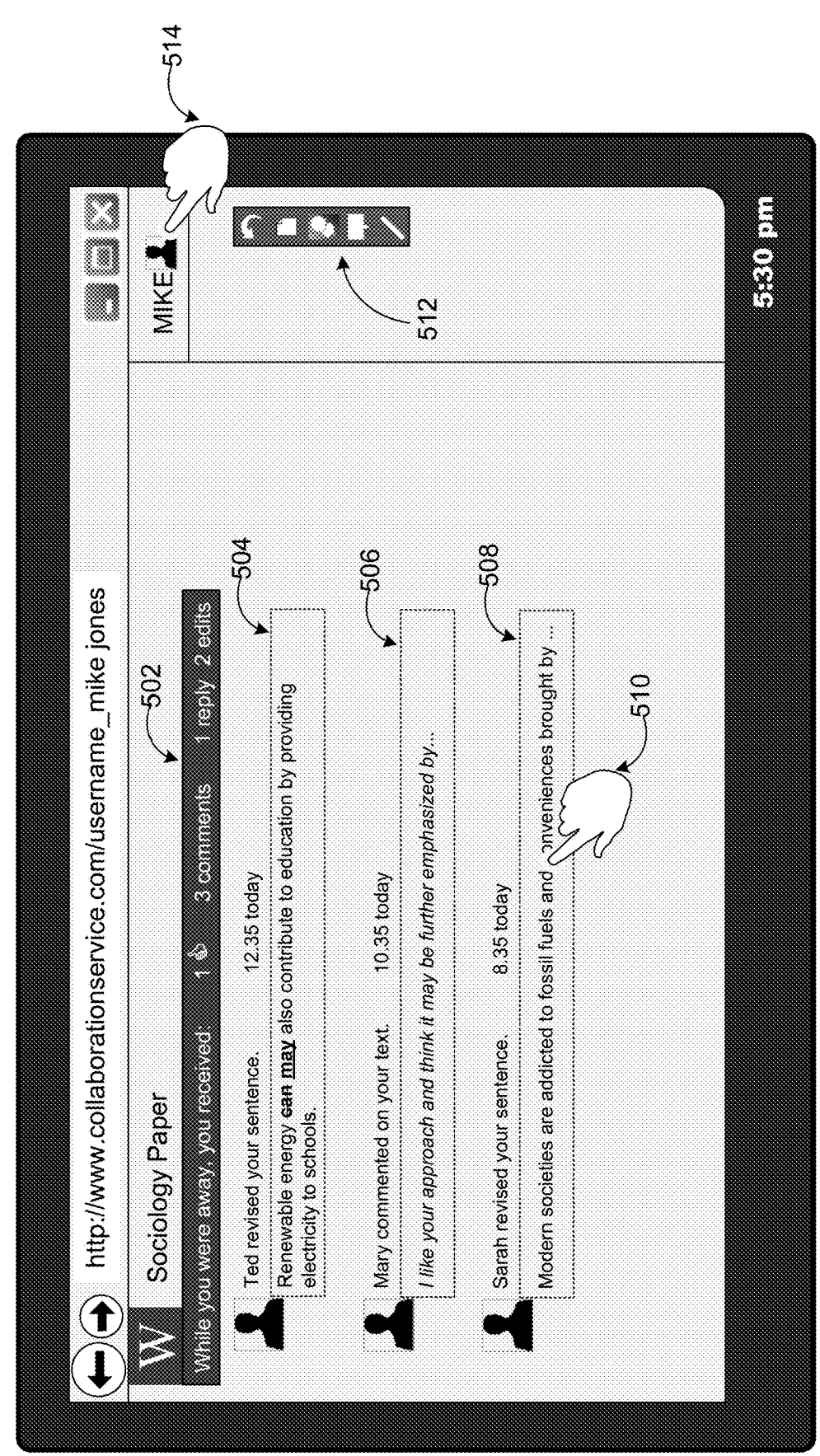
FIGS. 5A and 5B illustrate screenshots of example user interfaces for notifying an author about changes and/or comments in collaboratively created content.
Figure 5B:
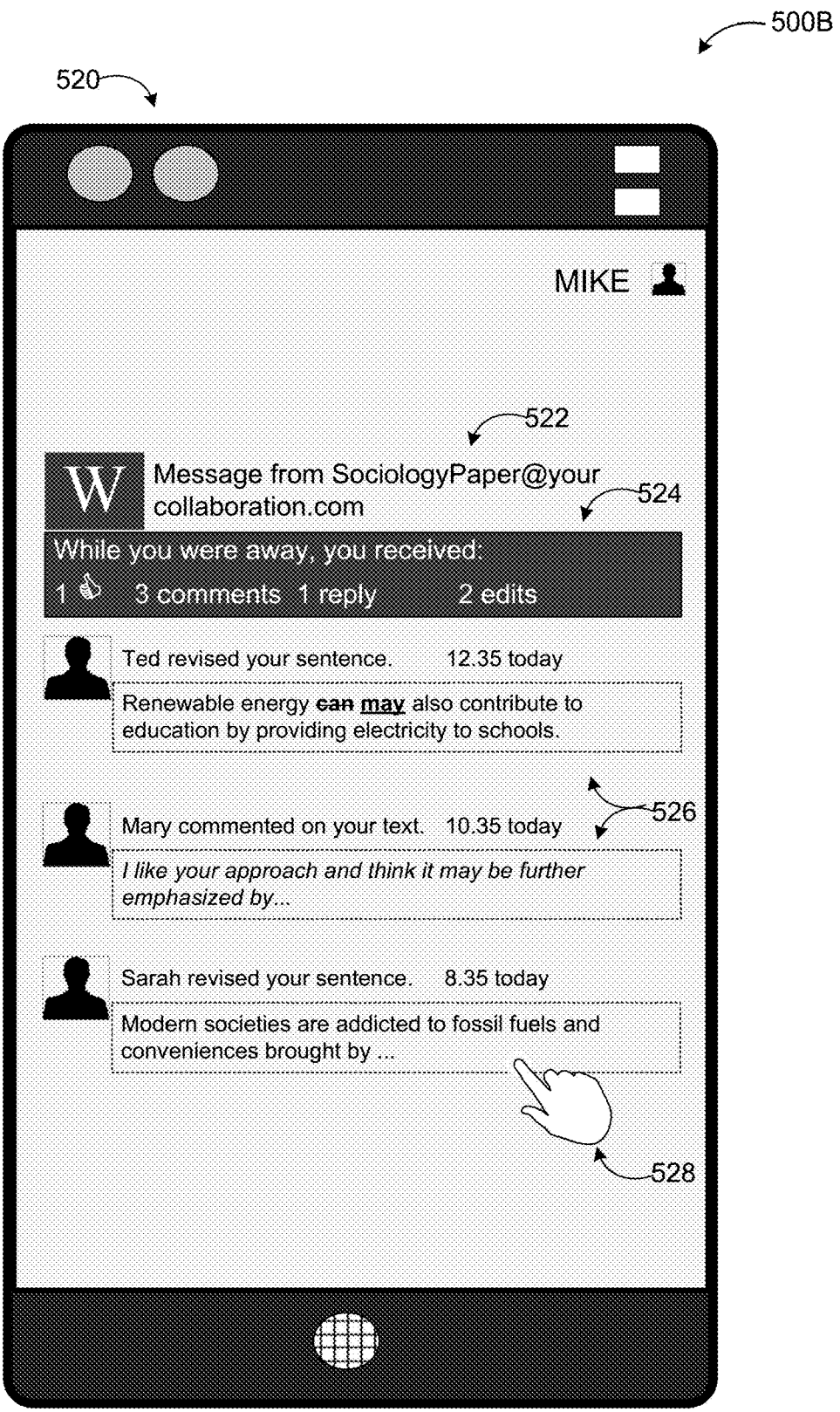

FIGS. 5A and 5B illustrate screenshots of example user interfaces for notifying an author about changes and/or comments in collaboratively created content.

In screenshot 500A, a notification user interface of a collaborative authoring application is shown for a particular author (Mike Jones). While viewing the created content, an author may be enabled to switch to the illustrated notification user interface by activating a control such as an icon representing them through a touch or gesture action 514, for example. Of course other input methods such as keyboard, mouse, pen, voice command, and comparable ones may also be accepted.

The example user interface may present a summary 502 of changes/comments associated with a portion of the content of interest to the author or the entire content. Below the summary 502, each change or comment (504, 506, and 508) may be presented in summarized form. For example, a name, a nature of change/comment, and a time of change/comment may be presented along with a representative portion (e.g., a beginning) of the affected portion or comment.

Upon selection 510 of one of the summarized form changes or comments, the details of the change or comment (e.g., the full change or comment) may be displayed. Furthermore, additional controls 512 for switching to the content being created, sending a text message, attaching a note, replying to a comment/note, or making an edit on the content may also be provided.

Screenshot 500B of FIG. 5B illustrates a notification of changes and comments on an author's small form computing device such as a smart phone. The notification may be sent to the author as a message 522 with an indication of the source and include a summary of the changes and/or comments 524 similar to the summary 502 in FIG. 5A. The notification message 522 may also include a listing of changes and comments 526 with representative icons and names of their respective authors, nature of change/comment, time of change/comment, and the change or comment in summarized form as discussed above.

Figure 6:
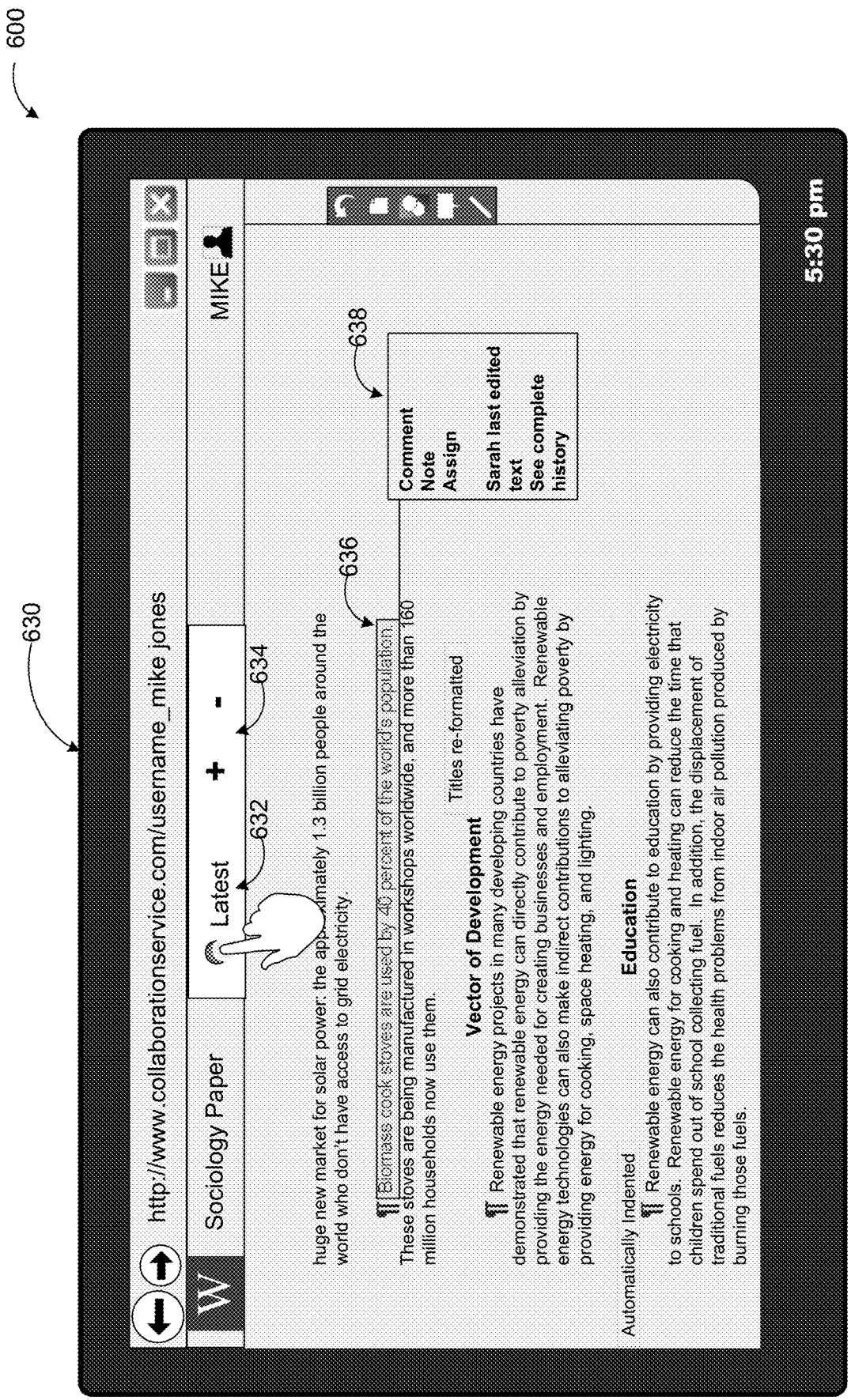
FIG. 6 illustrates a screenshot of an example user interface allowing various options on change tracking and commenting for collaborative content.

Referring to FIG. 6, diagram 600 illustrates an example user interface 630 allowing various options on change tracking and commenting for collaborative content.

In the example embodiment shown in diagram 600, options provided to the user upon highlighting of a portion 636 of the displayed content in an options menu 638 are illustrated. For example, an author may be enabled to comment on the highlighted portion, insert a note (e.g., for the collaborators) associated with the highlighted portion, or assign the highlighted portion to a collaborator. Additional information may also be presented such as which collaborator last edited the highlighted portion. The author may also be enabled to view a complete history of edits on the highlighted portion 636 of the displayed content. In some embodiments, color/highlighting, shading, and/or textual schemes may be employed to emphasize the changes/comments.

Additional aspects shown in user interface 630 include controls for selecting changes and/or comments by going through them one-by-one (634) or selecting the latest change/comment (632).

Authors employing a collaborative authoring application according to embodiments may determine easily who—if anyone—changed their content and if they made a suggestion, what happened, etc. Communication may be through a variety of modes including comments and/or email. Changes may be edited and submitted. Notifications may be provided in a configurable manner about changes. Private editing may be enabled in co-authoring, and authors may be enabled to re-join a thread, which may be per section or for the whole document. Furthermore, a time line summary for the changes may be provided.

The examples in FIG. 1 through 6 have been described with specific user interface elements, configurations, and presentations. Embodiments are not limited to systems according to these example configurations. Tracking changes in a collaborative authoring environment may be implemented in configurations using other types of user interface elements, presentations, and configurations in a similar manner using the principles described herein.

Figure 7:
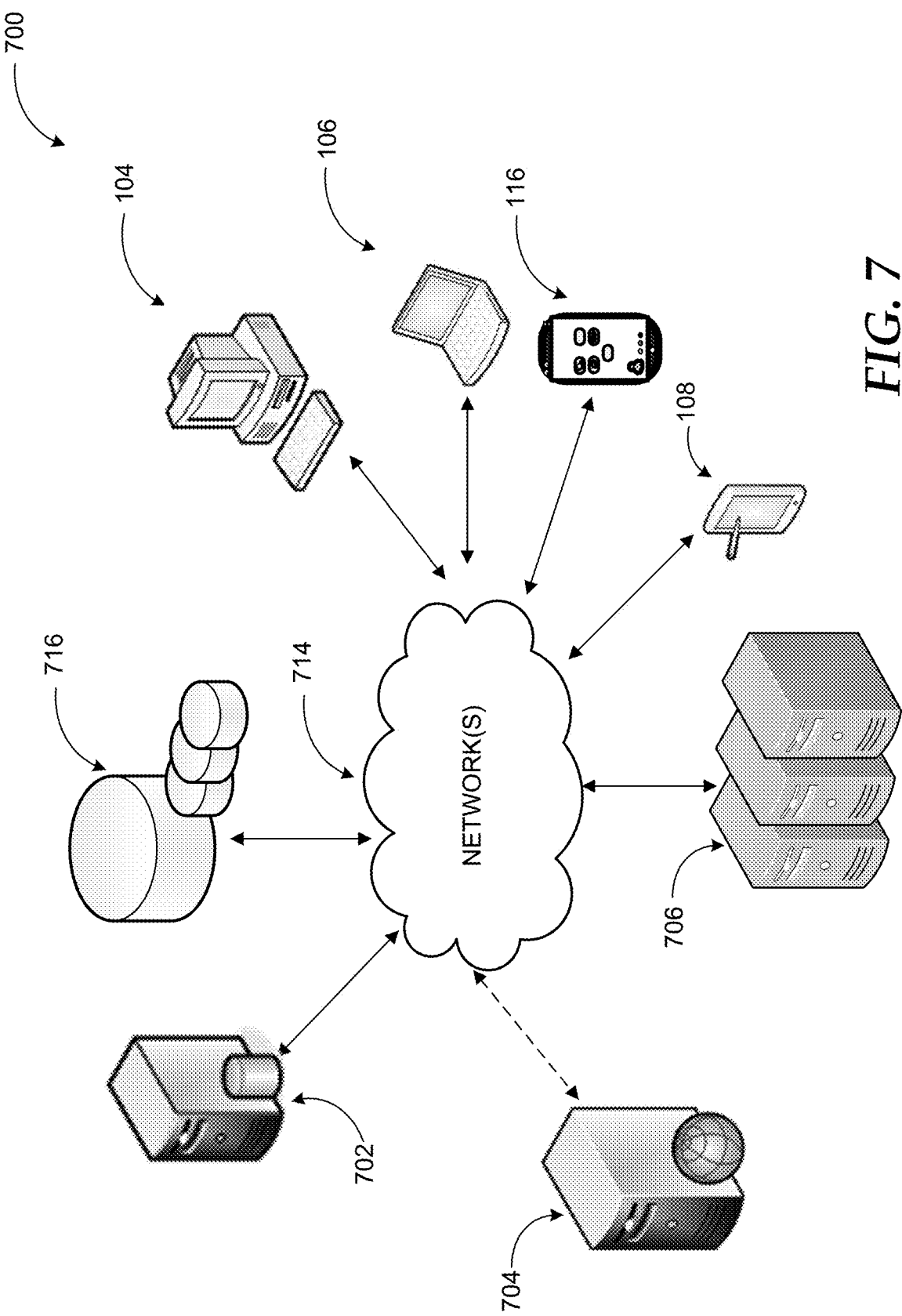
FIG. 7 is a networked environment, where a system according to embodiments may be implemented.

FIG. 7 is an example networked environment, where embodiments may be implemented. A system tracking changes in a collaborative authoring environment may be implemented via software executed over one or more servers 706 such as a hosted service. The platform may communicate with client applications on individual computing devices such as the desktop computer 104, laptop computer 106, smart phone 116, and tablet 108 (client devices') through network(s) 714.

Client applications executed on any of the client devices may facilitate communications with hosted content processing applications executed on servers 706, or on individual server 704. A collaborative authoring application executed on one of the servers may facilitate collaboration with change tracking as discussed above. The collaborative authoring application may retrieve relevant data from data store(s) 716 directly or through database server 702, and provide requested services to the user(s) through the client devices.

Network(s) 714 may comprise any topology of servers, clients, Internet service providers, and communication media. A system according to embodiments may have a static or dynamic topology. Network(s) 714 may include secure networks such as an enterprise network, an unsecure network such as a wireless open network, or the Internet. Network(s) 714 may also coordinate communication over other networks such as Public Switched Telephone Network (PSTN) or cellular networks. Furthermore, network(s) 714 may include short range wireless networks such as Bluetooth or similar ones. Network(s) 714 provide communication between the nodes described herein. By way of example, and not limitation, network(s) 714 may include wireless media such as acoustic, RF, infrared and other wireless media.

Many other configurations of computing devices, applications, data sources, and data distribution systems may be employed to implement a platform providing collaborative authoring with change tracking and notification. Furthermore, the networked environments discussed in FIG. 7 are for illustration purposes only. Embodiments are not limited to the example applications, modules, or processes.

Figure 8:
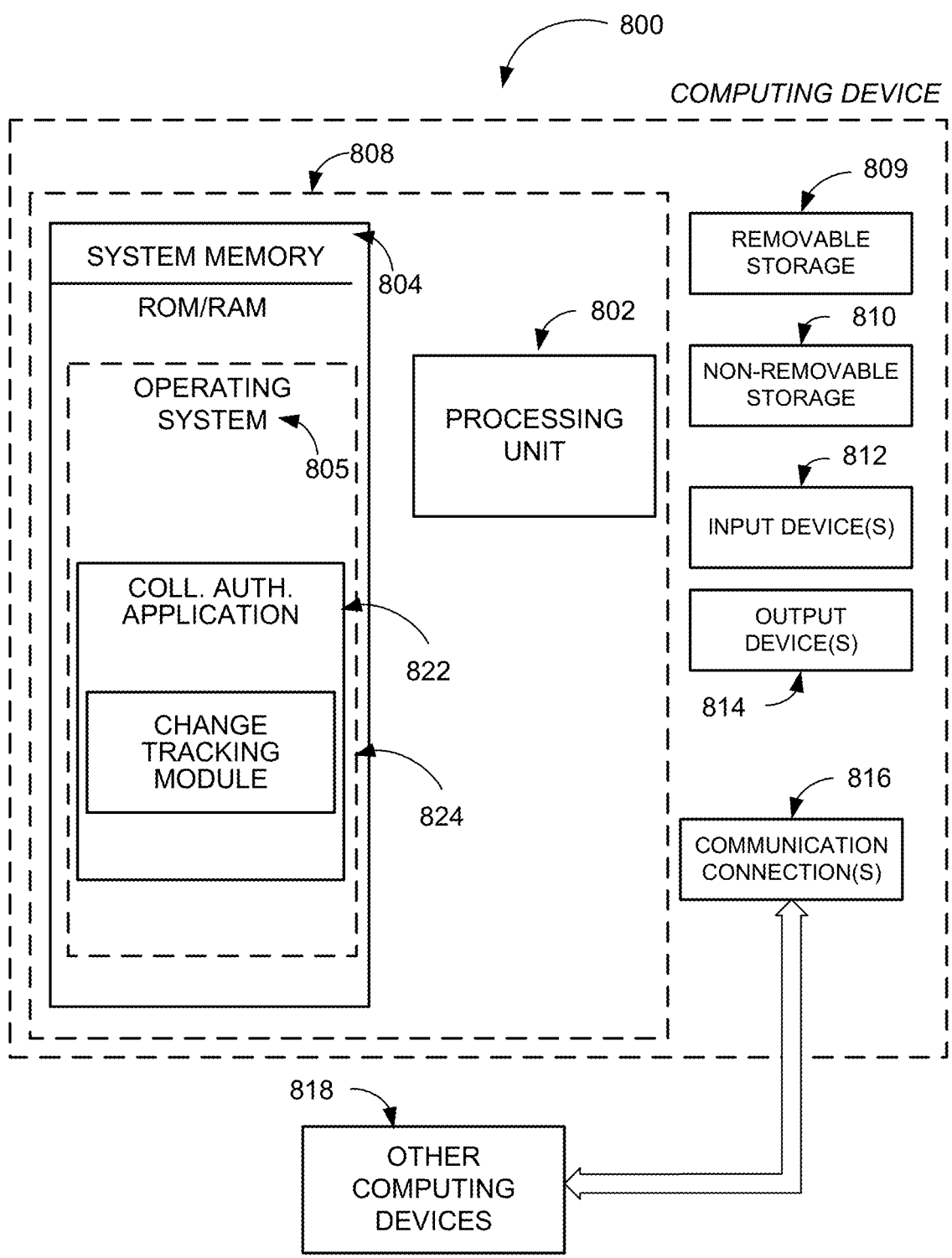
FIG. 8 is a block diagram of an example computing operating environment, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as the computing device 106. In a basic configuration, computing device may be any computing device with communication capabilities, and include at least one processing unit 812 and a system memory 804. The computing device 800 may also include a plurality of processing units that cooperate in executing programs. Depending on the exact configuration and type of computing device, a system memory 804 may be volatile (such as RAM), non-volatile (such as ROM, flash memory, etc.) or some combination of the two. The system memory 804 typically includes an operating system 805 suitable for controlling the operation of the platform, such as the WINDOWS®, WINDOWS MOBILE®, or WINDOWS PHONE® operating systems from MICROSOFT CORPORATION of Redmond, Wash. The system memory 804 may also include one or more software applications such as collaborative authoring application 822 and change tracking module 824.

The collaborative authoring application 822 may enable creation and editing of content by multiple authors. The collaborative authoring application 822 through the change tracking module 824 may notify authors about changes that affect a particular author, notify about co-authors of changes, restore or compare versions and/or notes, and/or provide a pivot history by author. The collaborative authoring application 822 and the change tracking module 824 may be separate applications or integrated modules of a hosted service. This basic configuration is illustrated in FIG. 8 by those components within a dashed line 802.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage 814 and a non-removable storage 816. Computer readable storage media may include volatile and nonvolatile, removable and non-removable media implemented in any method or technology for storage of information, such as computer readable instructions, data structures, program modules, or other data. The system memory 804, removable storage 814 and the non-removable storage 816 are all examples of computer readable memory device. Computer readable memory devices include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by the computing device 800. Any such computer readable storage media may be part of the computing device 800. The computing device 800 may also have the input device(s) 818 such as keyboard, mouse, pen, voice input device, touch input device, an optical capture device for detecting gestures, and comparable input devices. An output device(s) 820 such as a display, speakers, printer, and other types of output devices may also be included. These devices are well known in the art and need not be discussed at length here.

Some embodiments may be implemented in a computing device that includes a communication module, a memory device, and a processor, where the processor executes a method as described above or comparable ones in conjunction with instructions stored in the memory device. Other embodiments may be implemented as a computer readable memory device with instructions stored thereon for executing a method as described above or similar ones. Examples of memory devices as various implementations of hardware are discussed above.

The computing device 800 may also contain communication connections 822 that allow the device to communicate with other devices 826, such as over a wired or wireless network in a distributed computing environment, a satellite link, a cellular link, a short range network, and comparable mechanisms. Other devices 826 may include computer device(s) that execute communication applications, web servers and the comparable device 108. Communication connection(s) 822 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
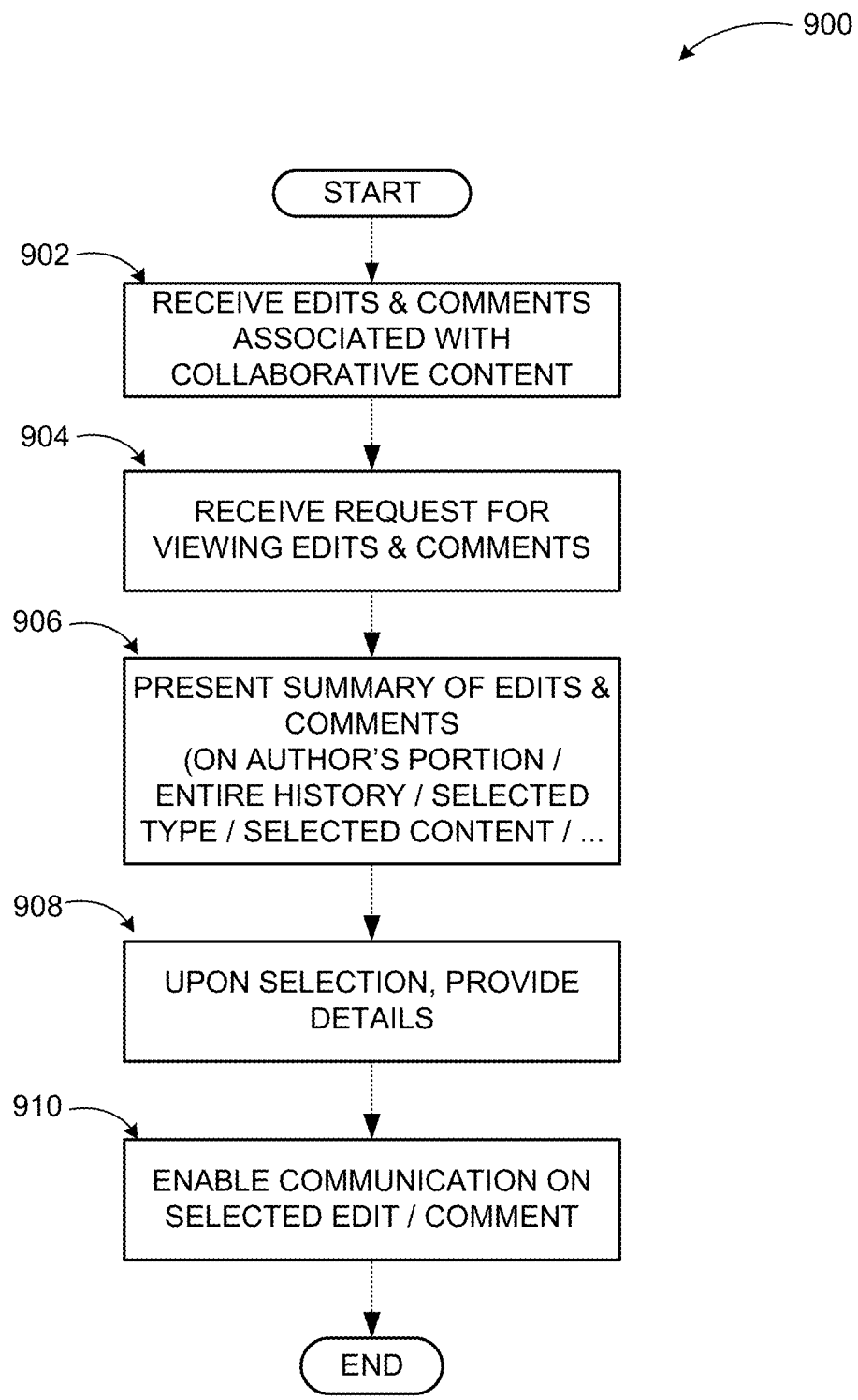
FIG. 9 illustrates a logic flow diagram for a process of tracking changes in a collaborative authoring environment according to embodiments.

FIG. 9 illustrates a logic flow diagram for a process 900 of tracking changes in a collaborative authoring environment according to embodiments. The process 900 may be implemented on a server or other computing device.

The process 900 begins with an operation 902, where edits and/or comments for collaboratively created content may be received at a collaboration application. The application may subsequently receive a request for viewing the edits or comments through a user action of present them automatically in a predefined mode or user interface at operation 904.

At operation 906, the application may present a summary of edits and/or comments such as author of an edit, source of a comment, etc. The edits and/or comments may be provided based on a portion of the content that is of interest to an author, changes that affect an author, history of the entire content or portions of it, a selected type of edit (e.g., revisions or additions), a selected portion of content, and similar ones. At operation 908, details of selected edits or comments may be displayed upon selection of one or more edits or comments. Alternatively, details of changes and/or comments may be displayed in response to selection of a portion of content or selection of an author in the collaboration team. At operation 910, collaborating authors may be enabled to communicate within a context of the content (e.g., through notes, comments, and other forms of exchanges).

In some embodiments, the edits and comments may be presented upon determining a return of the author to the collaborative authoring environment. Alternatively, they may be presented upon detecting selection of a portion of the content or activation of a change view on a collaborative authoring application user interface (UI). The summary of each edit or comment may include an initial portion of each edit and comment, where a size of the initial portion is selected based on available display area on a computing device of the author. A selected edit may be displayed in a changed mode and the author may be enabled to switch to a change-tracked mode for viewing the edit. The edits and comments may be displayed in order of a time of each edit and comment, a relevance of each edit and comment to the author, or a type of each edit and comment. Moreover, A set of controls may be displayed for enabling the author to switch to edit mode, reply to a comment, send a note to the co-author, and/or accept or reject an edit.

The operations included in the process 900 are for illustration purposes. Tracking changes in a collaborative authoring environment may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device for tracking changes in a collaborative authoring environment, the method comprising:
   detecting a creation of collaborative content;
   receiving modifications to the collaborative content from a plurality of authors;
   receiving a request to view the modifications to the collaborative content;
   displaying a summary of the modifications to the collaborative content;
   presenting a subset of the modifications to an author who is viewing the collaborative content, wherein the subset of the modifications comprises edits or comments to a portion of the collaborative content originally provided by the author, wherein the subset of the modifications omits modifications to other portions of the collaborative content that are originally provided by other authors; and
   enabling the author to communicate with a co-author by one or more of an addition of a note to the subset of the modifications and an addition of a comment to the subset of the modifications.

2. The method of claim 1, further comprising:
   receiving comments associated with the collaborative content;
   receiving another request to view the comments associated with the collaborative content; and
   displaying a summary of the comments associated with the collaborative content.

3. The method of claim 2, further comprising:
   in response to detecting a selection of a subset of the comments, displaying details associated with the subset of the comments, wherein the details include one or more of an author who drafted the subset of the comments, a time stamp associated with the creation of the subset of the comments, and a portion of the collaborative content associated with the subset of the comments; and
   enabling the author who is viewing the subset of the comments to one or more of communicate with a co-author and assign the subset of the comments to another co-author.

4. The method of claim 1, further comprising:
   in response to comparing a first time stamp to a second time stamp, determining a first set of the modifications as being older than a second set of the modifications, wherein the first time stamp is associated with creating the first set of modifications and the second time stamp is associated with creating the second set of the modifications; and
   highlighting a portion of the collaborative content associated with the second set of the modifications.

5. The method of claim 4, further comprising:
   enabling an author to one or more of insert a comment into the highlighted portion of the collaborative content and insert a note into the highlighted portion of the collaborative content.

6. The method of claim 4, further comprising:
   enabling the author to one or more of reply to a comment associated with the highlighted portion of the collaborative content and assign the highlighted portion of the collaborative content to a co-author.

7. The method of claim 4, further comprising:
   detecting an action executed on the highlighted portion of the collaborative content;
   presenting one or more of a history of the modifications to the highlighted portion of the collaborative content and a history of comments to the highlighted portion of the collaborative content; and
   employing one of: a textual scheme, a coloring scheme, a shading scheme, and a graphical element to distinguish the modifications to the highlighted portion of the collaborative content from the comments to the highlighted portion of the collaborative content.

8. The method of claim 1, further comprising:
   detecting an action executed on a portion of the collaborative content; and
   presenting one or more of the modifications to the portion of the collaborative content, comments associated with the portion of the collaborative content, and a type of the modifications to the portion of the collaborative content.

9. The method of claim 1, further comprising:
   detecting an action executed on a portion of the collaborative content; and
   presenting one or more of a history of the modifications to the portion of the collaborative content and a history of comments associated with the portion of the collaborative content.

10. A computing device for tracking changes in a collaborative authoring environment, the computing device comprising:
   a memory;
   a processor coupled to the memory, the processor executing a collaborative authoring application, wherein the collaborative authoring application is further configured to:
      detect a creation of collaborative content, wherein the collaborative content includes one or more of textual content, an image, a graphic, an embedded audio object, and an embedded video object;
      receive modifications to the collaborative content from a plurality of authors;
      receive a request to view the modifications to the collaborative content;
      display a summary of the modifications to the collaborative content on a collaborative authoring user interface (UI);
      display a subset of the modifications to an author who is viewing the collaborative content, wherein the subset of the modifications comprises edits or comments to a portion of the collaborative content originally provided by the author, wherein the subset of the modifications omits modifications to other portions of the collaborative content that are originally provided by other authors; and
      enable the author to communicate with a co-author by one or more of an addition of a note to the subset of the modifications and an addition of a comment to the subset of the modifications.

11. The computing device of claim 10, wherein the collaborative authoring application is further configured to:
   in response to comparing a first time stamp to a second time stamp, determine a first set of the modifications as being older than a second set of the modifications, wherein the first time stamp is associated with creating the first set of the modifications and the second time stamp is associated with creating the second set of the modifications.

12. The computing device of claim 11, wherein the collaborative authoring application is further configured to:
   order, based on the first time stamp and the second time stamp, the first set of the modifications and the second set of the modifications in one of an ascending order and a descending order; and
   display, on the collaborative authoring UI, a time line summary of the modifications to the collaborative content based on the ordering.

13. The computing device of claim 10, wherein the collaborative authoring application is further configured to:
   identify information associated with the author, wherein the information includes one or more of a credential associated with the author and an identification of the author;
   compare the information to one or more of a predefined rule and a predefined scheme;
   detect a match between the information and one or more of the predefined rule and the predefined scheme; and
   enable the author to modify the collaborative content.

14. The computing device of claim 10, wherein the details include one or more of the author of the subset of the modifications, a time stamp associated with the creation of the subset of the modifications, and a portion of the collaborative content associated with the subset of the modifications.

15. A computer-readable memory device with instructions stored thereon for tracking changes in a collaborative authoring environment, the instructions comprising:
   detecting a creation of collaborative content, wherein the collaborative content includes one or more of textual content, an image, a graphic, an embedded audio object, and an embedded video object;
   receiving modifications to the collaborative content from a plurality of authors;
   receiving a request to view the modifications to the collaborative content;
   displaying a summary of the modifications to the collaborative content on a collaborative authoring user interface (UI);
   in response to detecting a selection of a subset of the modifications, displaying details associated with the subset of the modifications, wherein the subset of the modifications comprises edits or comments to a portion of the collaborative content originally provided by the author, wherein the subset of the modifications omits modifications to other portions of the collaborative content that are originally provided by other authors; and
   enabling an author who is viewing the subset of the modifications to communicate with a co-author by one or more of an addition of a note to the subset of the modifications and an addition of a comment to the subset of the modifications.

16. The computer-readable memory device of claim 15, wherein the instructions further comprise:
   in response to comparing a first time stamp to a second time stamp, determining a first set of the modifications as being older than a second set of the modifications, wherein the first time stamp is associated with creating the first set of modifications and the second time stamp is associated with creating the second set of the modifications; and
   highlighting a portion of the collaborative content associated with the second set of the modifications.

17. The computer-readable memory device of claim 16, wherein the instructions further comprise:
   enabling an author to one or more of: insert a comment into the highlighted portion of the collaborative content, insert a note into the highlighted portion of the collaborative content, reply to a comment associated with the highlighted portion of the collaborative content, and assign the highlighted portion of the collaborative content to a co-author.

18. The computer-readable memory device of claim 16, wherein the instructions further comprise:
   detecting an action executed on the highlighted portion of the collaborative content;
   presenting one or more of a history of the modifications to the highlighted portion of the collaborative content and a history of comments to the highlighted portion of the collaborative content; and
   employing one of: a textual scheme, a coloring scheme, a shading scheme, and a graphical element to distinguish the modifications to the highlighted portion of the collaborative content from the comments to the highlighted portion of the collaborative content.

19. The method of claim 1, wherein the portion of the collaborative content is originally provided by the author associated with a display device rendering the collaborative content, wherein the collaborative content is not originally provided by the other authors of the plurality of authors.

20. The method of claim 1, wherein the portion of the collaborative content is originally provided by the author associated with a display device rendering the collaborative content, wherein the collaborative content is not originally provided by the other authors of the plurality of authors, and wherein the collaborative content comprises at least one of a portion of text, an image, a graphic, or an embedded object.

* * * * *